Feb. 8, 1955  M. D. BALISTRERI  2,701,379
HANDLE GRIP
Filed Nov. 1, 1951
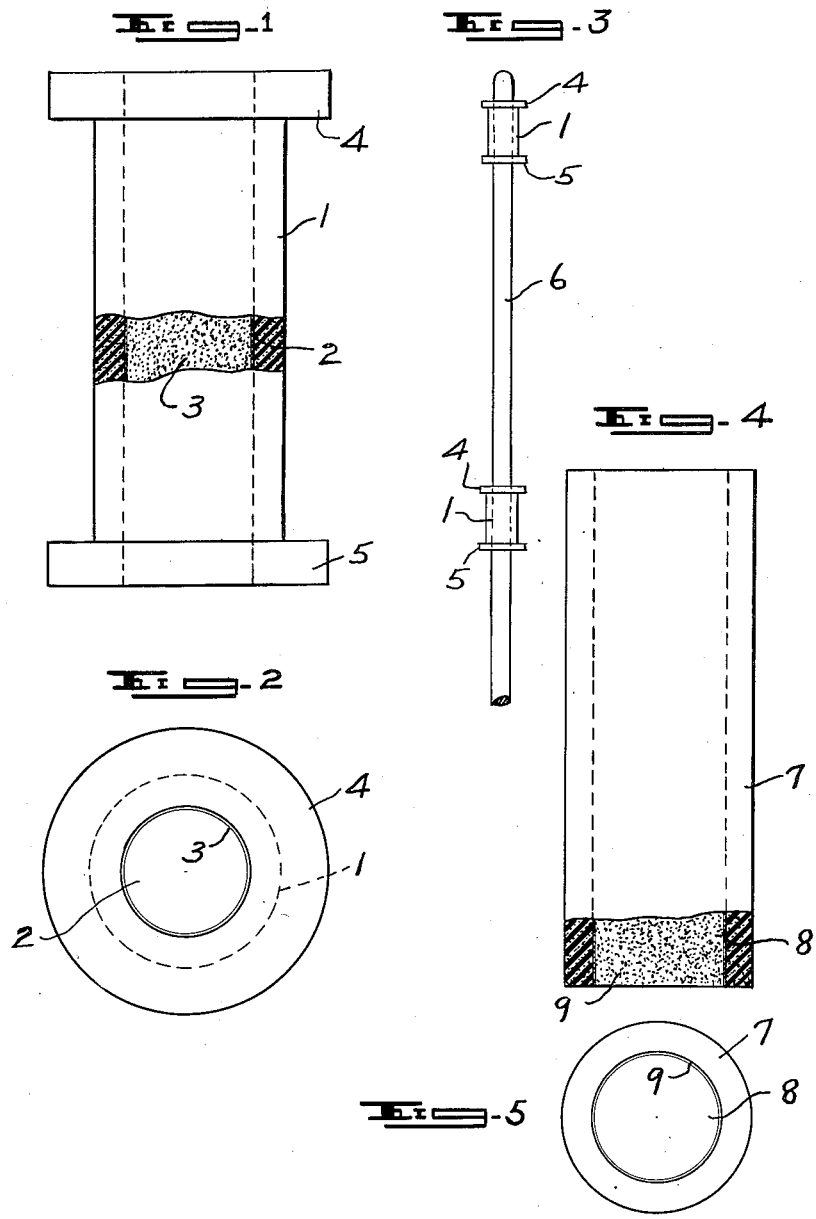
INVENTOR.
MILDRED D. BALISTRERI
BY
*Jack Snyder*
attorney United States Patent Office 2,701,379
Patented Feb. 8, 1955

2,701,379

HANDLE GRIP

Mildred D. Balistreri, Pittsburgh, Pa.

Application November 1, 1951, Serial No. 254,389

1 Claim. (Cl. 15—143)

This invention relates to a handle grip, and while primarily designed and intended for use in connection with brooms, mops, and like handled implements ordinarily used in the home, it will be obvious that the invention may be successfully employed in other implements and used for any other purposes wherein it is found to be applicable.

Important objects and advantages of the invention are to provide a handle grip of the character described, which will protect the hands of the user and facilitate the manipulation of the implement equipped therewith, which may be readily mounted and adjusted on the handle structure, which is simple in its construction and arrangement, durable and efficient in its use, attractive in appearance, and comparatively economical in its manufacture.

To the accomplishment of these and such other objects as may hereinafter appear, the invention resides in the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a side elevational view, partly in section, of a handle grip constructed in accordance with the invention.

Figure 2 is a top plan view thereof.

Figure 3 is a side elevational view illustrating the application of a pair of the improved handle grips to a handle structure.

Figure 4 is a side elevational view, partly in section, of a modified form of the invention.

Figure 5 is a plan view of the modification shown in Figure 4.

Referring in detail to the drawing, the improved handle grip comprises a cylindrical sleeve 1 approximately four inches in length. The sleeve is provided with a cylindrical passage 2 which extends throughout the length of the sleeve and is open at both ends.

Each end of the sleeve 1 is provided with an annular, laterally projecting collar, respectively indicated at 4 and 5. The collars serve to reenforce the ends of the sleeve and afford gripping properties facilitating the manipulation of the implement equipped with the improved device.

The handle grip is preferably constructed of comparatively soft sponge rubber of considerable thickness, but it will be apparent that the device may be made of any other suitable material, and that the handle grip may be molded to form as an integral structure or assembled as a composite structure without departing from the principle or sacrificing any advantages of the invention.

The entire face of the sleeve passage 2 is covered with an elastic, comparatively dense, friction coating 3, which latter, while offering considerable resistance to movement, will not cause the permanent adherence of the grip to the handle 6 of the implement upon which the grip is mounted. It will be evident that the friction coating provides considerable stability to the wall of the passage 2.

When the device is used in connection with a broom or mop handle, or the like, requiring both hands in the use of the implement, two of the improved handle grips are mounted on the handle in properly spaced relation to each other, as clearly illustrated in Figure 3.

To mount the handle grip in position of the handle 6, the latter is extended through the passage 2 in the former, and it will be necessary to work the grip to the proper position on the handle due to the inherent compressive action of the elastic sleeve and to the frictional resistance offered by the friction coating 3.

While the working of the handle grip to the properly adjusted position on the handle may be accomplished with comparative ease, the pressure upon the handle grip by the user, together with the compressive action of the handle grip itself and the frictional resistance offered by the friction coating 3, will serve to maintain the handle grip in its adjusted position and prevent the rotation or longitudinal movement in either direction of the handle grip on the handle structure.

The modified form of handle grip, illustrated in Figures 4 and 5, comprises a sponge rubber sleeve 7 having a passage 8, which has its wall face covered with a friction coating 9. The modified form of handle grip differs from the preferred form of handle grip, herein before described, only in that the sleeve 7 of the modified form is not provided and reenforced with the annular collars at respective ends thereof in the manner embodied in the preferred form.

The present invention provides a most efficient device of its kind, which may be economically constructed and successfully employed for the purposes and in the manner herein set forth.

What I claim is:

A hand grip for an implement handle, comprising in combination, a cylindrical sleeve constructed of sponge rubber of considerable thickness, an annular laterally projecting sponge rubber collar attached to and surrounding each end of said sleeve for reenforcing respective ends of the latter, each of said collars being of considerable thickness and projecting a considerable distance beyond the peripheral surface of said sleeve, said sleeve formed with a passage for the insertion of the handle through said sleeve for adjustably mounting the latter on the handle, and a friction coating covering the face of the wall of said passage and exerting frictional resistance to the movement of said sleeve on said handle.

References Cited in the file of this patent

UNITED STATES PATENTS

| | | |
|---|---|---|
| 184,918 | Siddall | Nov. 28, 1876 |
| 1,800,254 | Holmes | Apr. 14, 1931 |
| 1,980,655 | Balistreri | Nov. 13, 1934 |
| 2,063,132 | Sund | Dec. 8, 1936 |
| 2,466,719 | Mac Kearnin | Apr. 12, 1949 |
| 2,560,856 | Franta | July 17, 1951 |